United States Patent
Kallas et al.

(10) Patent No.: US 6,778,653 B1
(45) Date of Patent: Aug. 17, 2004

(54) STORING INFORMATION ABOUT A TELEPHONY SESSION

(75) Inventors: Michel Kallas, Allen, TX (US); James Michael Lyell, Garland, TX (US); Paul Spencer Dawkins, Allen, TX (US)

(73) Assignee: Nortel Networks Limited, St. Laurent (*) Notice: Subject to any disclaimer, the term of this patent is extended or adjusted under 35 U.S.C. 154(b) by 0 days.

(21) Appl. No.: 09/436,563

(22) Filed: Nov. 9, 1999

(51) Int. Cl.[7] .............................................. H04M 3/42
(52) U.S. Cl. ............................ 379/201.02; 379/201.05
(58) Field of Search ...................... 379/201.07, 201.08, 379/201.01–201.05; 370/351, 352, 400, 402, 493, 494, 495

(56) References Cited

U.S. PATENT DOCUMENTS

| | | | |
|---|---|---|---|
| 5,999,525 A | * 12/1999 | Krishnaswamy et al. | ... 370/352 |
| 6,102,406 A | * 8/2000 | Miles et al. | ................. 273/430 |
| 6,154,528 A | 11/2000 | Bennett, III et al. | ..... 379/93.25 |
| 6,327,609 B1 | * 12/2001 | Ludewig et al. | ............ 709/203 |
| 6,339,423 B1 | * 1/2002 | Sampson et al. | ........... 345/854 |

FOREIGN PATENT DOCUMENTS

| | | | |
|---|---|---|---|
| EP | 0 935 380 A2 | 8/1999 | ............ H04M/7/00 |
| WO | WO 98/13995 | 4/1998 | ............ H04M/3/56 |
| WO | WO 98/42119 | 9/1998 | ............ H04M/7/10 |

\* cited by examiner

*Primary Examiner*—Ahmad F. Matar
*Assistant Examiner*—Quynh H. Nguyen
(74) *Attorney, Agent, or Firm*—Trop, Pruner & Hu, P.C.

(57) ABSTRACT

A communications system includes nodes and terminals capable of being involved in a telephony session. Telephony cookies may be created in telephony sessions between a calling terminal and a called terminal. The telephony cookies may be created by the called terminal and sent to the calling terminal for storage. Contents of the telephony cookie may include identifiers of the calling terminal and the called terminal. Other contents may include the date and time the cookie was created, expiration data and time of the cookie, and a data field that can store other types of information relating to telephony sessions.

17 Claims, 11 Drawing Sheets

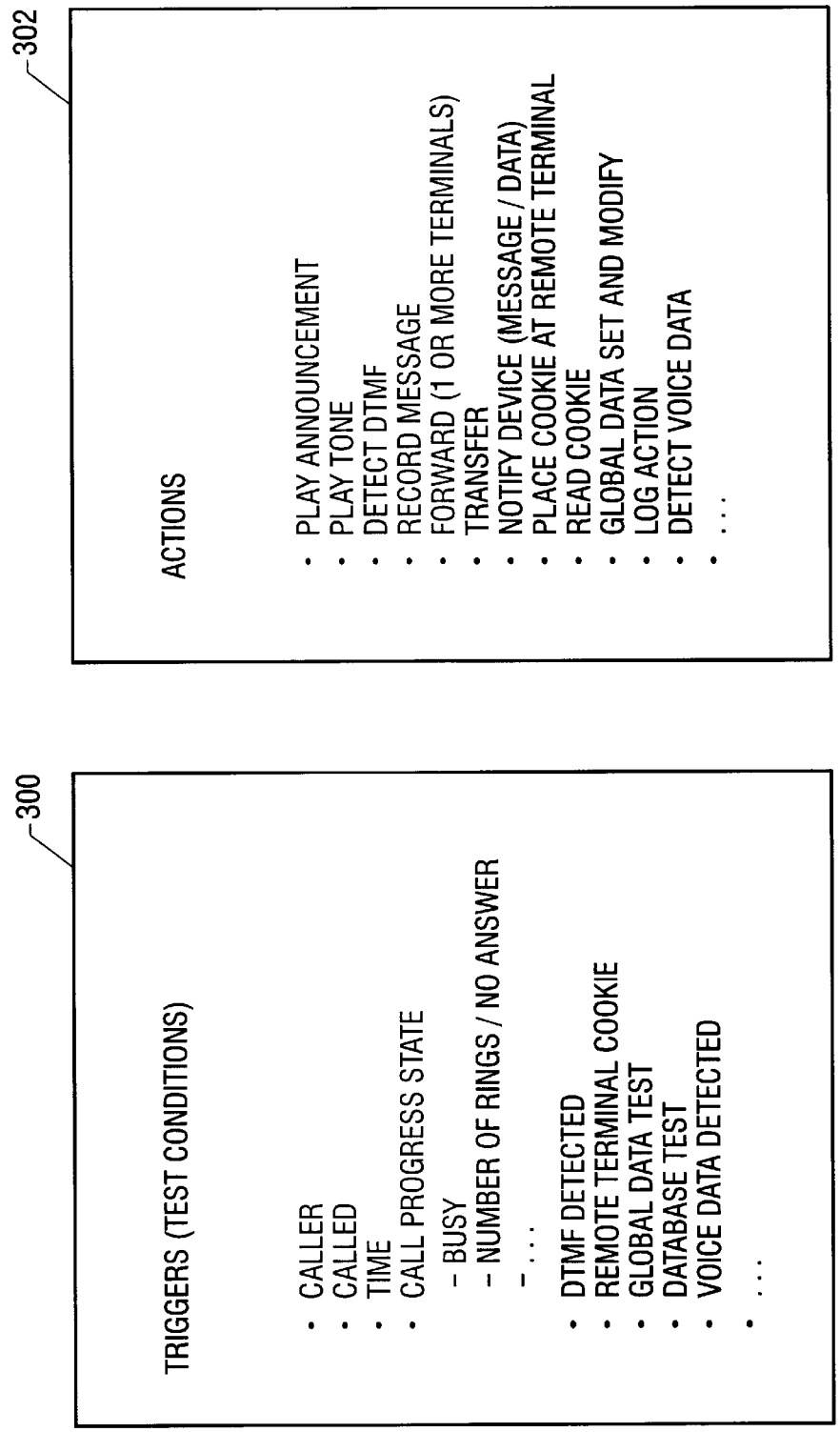

STORING INFORMATION ABOUT A TELEPHONY SESSION

BACKGROUND

The invention relates to storing information about telephony sessions.

Data networks are widely used to link various types of nodes, such as personal computers, servers, gateways, network telephones, and so forth. Networks may include private networks, such as local area networks and wide area networks, and public networks, such as the Internet. The increased availability of such data networks has improved accessibility among nodes coupled to the data networks. Popular forms of communications across such data networks include electronic mail, file transfer, web browsing, and other exchanges of digital data.

With the increased capacity and reliability of data networks, voice and multimedia communications over data networks have become possible. Such forms of communications include telephone calls over the data networks, video conferencing, and distribution of multimedia data (such as by multicast). Voice communications over data networks are unlike voice communications in a conventional public switched telephone network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice and multimedia data sent over a data network typically share the network bandwidth with conventional non-voice data (e.g., data associated with electronic mail, file transfer, web access, and other traffic).

Various standards have been proposed for voice and multimedia communications over data networks. For example, a multimedia data and control architecture has been developed by the Internet Engineering Task Force (IETF). The protocols that are part of the IETF multimedia data and control architecture include the Resource Reservation Protocol (RSVP) for reserving network resources; the Real-Time Transport Protocol (RTP) for transporting real-time data and providing quality of service (QoS) feedback; the Real-Time Streaming Protocol (RTSP) for controlling delivery of streaming media; the Session Announcement Protocol (SAP) for advertising multimedia sessions by multicast; the Session Description Protocol (SDP) for describing multimedia sessions; and the Session Initiation Protocol (SIP), which establishes, maintains, and terminates multimedia sessions or calls.

Conventionally, mechanisms have not been provided to describe telephony sessions. Thus, in conventional telephony systems, whether circuit-switched or packet-switched systems, a newly established telephony session proceeds without the benefit of a description of a prior telephony session. A need exists for a method and apparatus to store information describing telephony sessions.

SUMMARY

In general, according to one embodiment, a method for use in a telephony communications system includes establishing a telephony session between a first terminal and a second terminal and determining if a record of a prior telephony session between the first and second terminals exist. Information stored in the record is accessed for use in the current telephony session.

Some embodiments of the invention may have one or more of the following advantages. By storing information about a telephony session or sessions in one or more records, the information in the records may be used in subsequent telephony sessions. User convenience may be enhanced and calls may be expedited. For example, user options, account names, passwords, and so forth may be stored in a record so that such information may not need to be re-entered in a subsequent telephony session. Another example is the ability to store notes about a prior call in the record so that a party in a subsequent telephony session may learn about what transpired in a prior call.

BRIEF DESCRIPTION OF THE DRAWINGS

FIGS. 11 and 12 illustrate triggers and actions that are defined by a telephony scripting language used to create the script modules of FIG. 3.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. Although reference is made to telephony sessions over packet-based data networks such as Internet Protocol (IP) networks, further embodiments may perform telephony sessions over other forms of networks, whether circuit-switched or packet-switched.

Figure 1:
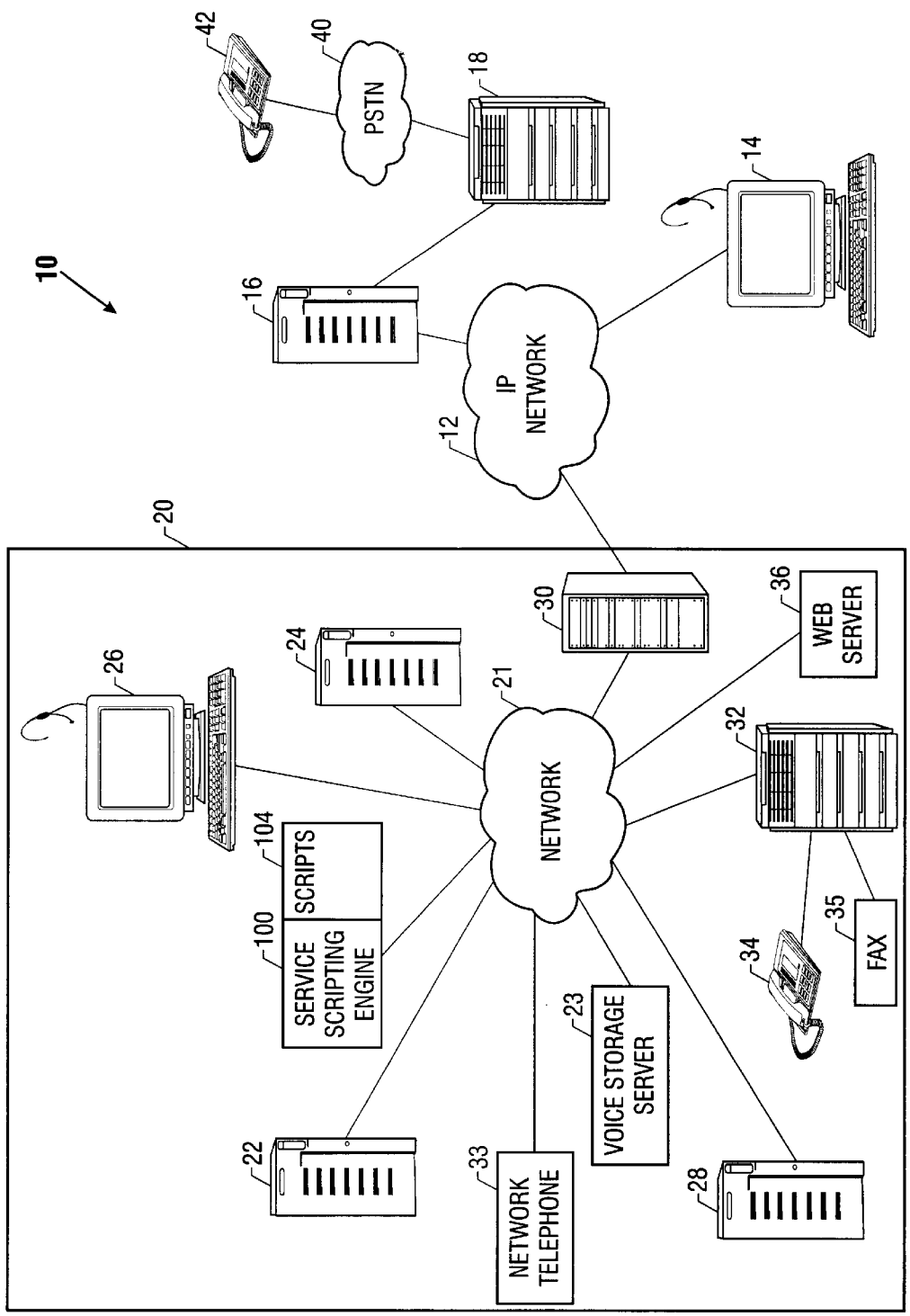
FIG. 1 is a block diagram of an embodiment of a communications system including packet-based data networks.

Referring to FIG. 1, a communications system 10 includes various nodes that are capable of communicating with each other. The example network nodes and the manner in which they are interconnected are for illustrative purposes only, and are not intended to limit the scope of the invention. Many other arrangements and architectures are possible in further embodiments.

The communications system 10 may include a private network 21 that is located in community 20 and a public network 12 (e.g., the Internet). A "community" may refer to any predetermined group of nodes or users that are connected through a network. A "private network" refers to a network that is protected against unauthorized general public access. A "network" may refer to one or more communications networks, links, channels, or paths, as well as routers used to pass data between nodes through such networks, links, channels, or paths. Although reference is made to "private" and "public" networks in this description, further embodiments may include networks without such designations. For example, a community may refer to nodes and elements coupled through a public network or a combination of private and public networks.

In one embodiment, the protocol used in the various networks may be the Internet Protocol (IP), as described in Request for Comments (RFC) 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998. Packet-based networks such as IP networks communicate with packets, datagrams, or other units of data that are sent over the networks. Unlike circuit-switched networks, which provide a dedicated end-to-end connection or physical path for the duration of a call session, a packet-based network is one in which the same path may be shared by several nodes. Packet-based networks such as IP networks are based on a connectionless internetwork layer. Packets or other units of data injected into a packet-based data network may travel independently over any network (and possibly over different networks) to a destination terminal. The packets may even arrive out of order. Routing of the packets is based on one or more addresses carried in each packet. Other types of networks include connection-oriented networks, such as Asynchronous Transfer Mode (ATM) networks, which are based on a virtual circuit model. In an ATM system, a virtual connection is established between two points, with packets of data being sent between the two points over the same path and arriving in the same order the packets were sent.

The community 20 may include nodes that allow users to participate in audio (e.g., voice) and multimedia (e.g., audio and video) communications sessions. Examples of such communications sessions include telephone calls, video conferencing, and other sessions. In this description, such communications sessions are referred to as telephony sessions. Various telephony services may be performed in a telephony session. For example, an announcement may be played, a message may be recorded, a tone may be played, detection for a dual tone multi-frequency (DTMF) signal may be performed, a call can be forwarded from one terminal to another terminal, and so forth. A "telephony service" may be defined as any action or service associated with a telephony session. A "telephony session" may include a telephone call between two or more users or two or more terminals. Other forms of telephony sessions include video conferencing. In a telephony session that occurs over a packet-based network, control signaling and traffic data (e.g., voice) are carried over the packet-based network.

In accordance with some embodiments, to expedite the establishment of telephony sessions between two given terminals, especially if the terminals have been involved in a telephony session with each other in the past, information may be stored that describes the prior telephony session(s) between the two terminals. In addition to identifiers identifying the two terminals, such stored information may also identify preferences of a user, events that transpired in a prior call, user name and password, and other information. Once such information is stored in a record, subsequent telephony sessions may access the record to expedite a call. For example, a user may not have to enter a user name or password on a subsequent call. Stored historical information may allow one of the parties in a subsequent telephony session to quickly determine what has transpired in prior calls. More generally, the information stored in the record includes information relating to interaction between two terminals or parties. Such information includes information other than an identifier of the calling terminal or party (e.g., telephone number) and an identifier of the called terminal or party (e.g., telephone number).

In one embodiment, the information describing telephony sessions may be stored in a telephony cookie. In creating and storing the cookie, a telephony client system and a telephony server system may be involved. A client system may refer to a terminal that initiates a telephony session. A server system may refer to a node or terminal that receives the call request to handle and respond to the call.

Examples of communications devices that are capable of participating in telephony sessions over the network 21 include conventional telephones 34 and fax machines 35 that are coupled to a media gateway 32. The media gateway 32 connects non-network terminals, such as the telephones 34 and fax machine 35, to the network 21. The media gateway 32 works in conjunction with a media gateway controller 28 to route data between the network 21 and the terminals coupled to the media gateway 32. Although shown as separate components, the media gateway 32 and media gateway controller 28 may be implemented in the same platform. The media gateway controller 28 controls individual tasks and resources of the media gateway 32. In addition, the media gateway controller 28 controls communications to the terminals coupled to the media gateway 32.

The community 20 may also include network telephones 33, which are telephones with network interface units to enable communications over the network 21. Other communications devices include computers 26 that have voice and/or image processing capabilities. A user on one of the communications devices may call a user on another communications device, with voice and/or video data carried through the network 21. The network 21 may be connected to nodes outside the community 20 through a gateway system 30.

A call server 24 may also be coupled to the network 21 to manage the establishment, management, and termination of communications sessions between terminals coupled to the network 21. The call server 24 may be coupled to a database system 22 (which may be located on a separate platform or on the same platform as the call server 24) that includes a subscriber directory and a network directory. Also, policy for incoming and outgoing calls may be managed by the call server 24.

The subscriber directory in the database system 22 stores static and dynamic information about users in the community 20. The call server 24 accesses the subscriber directory to locate and route calls to users. The current location of a user may be changed by registering from a different location. The network directory in the database system 22 holds static and dynamic information about network elements and preferences. The network directory allows the call server 24 to determine the most appropriate network resource or resources to use in its operations.

Other nodes that may be coupled to the network 21 include a web server 36 to provide web pages accessible by users inside and outside of the community 20. Another system in the community 20 may be a voice storage server 23 in which voice data, such as those associated with voice mail, may be stored.

Calls originating from one terminal to another terminal are handled by the call server 24. The call server receives a call, and based on the identifying information in the call (including information identifying the source and destination terminals), the call server 24 routes the call accordingly.

In one embodiment, the call server 24 may perform establishment, management, and termination of telephony and other communications services in accordance with the multimedia data and control architecture from the Internet Engineering Task Force (IETF). The IETF multimedia data and control architecture includes a suite of protocols, including the Session Initiation Protocol (SIP), as described in RFC 2543, entitled "SIP: Session Initiation Protocol," dated March 1999. SIP may be used to initiate communications sessions as well as to invite members to sessions that may have been advertised by some other mechanism, such as electronic mail, news groups, web pages, and others. SIP allows for the determination of the end system to be used for the telephony session. SIP also allows for a determination of the media and media parameters to be used as well as the determination of the willingness of the called party to engage in telephony communications. SIP can also be used in conjunction with other call setup and signaling protocols, such as the H.323 Protocol from the Telecommunications Sector of the International Telecommunication Union (ITU-T). The H.323 protocol describes terminals, equipment, and services for multimedia communications over packet-based networks.

Various entities may be defined by SIP. A client according to SIP is an application program that sends SIP requests, such as to perform call requests. A server according to SIP may be an application program that accepts SIP requests to service calls and to send back responses to the SIP requests. A proxy or proxy server may be an intermediary program that acts as both a server and a client for making requests on behalf of other clients. An example of a proxy is the call server 24. An application program may be capable of acting both as a client and a server.

The IETF multimedia and control architecture also includes the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Announcement Protocol (SAP) for advertising multimedia sessions by multicast; and the Session Description Protocol (SDP), as described in RFC 2327, for describing multimedia sessions.

The protocols described are merely examples of protocols that may be used for communications sessions between network nodes. In further embodiments, other types of protocols may be used, such as protocols for communications sessions other than voice or multimedia communications sessions. In this description, telephony system according to SIP and other related protocols is an example of an environment is which script modules in accordance with some embodiments may be used to implement telephony services. However, it is contemplated that in further embodiments, script modules may be used to create telephony services that work with other protocols or standards.

The web server 36 coupled to the network 21 in the community 20 may be accessible through the gateway system 30 from outside the community 20. For example, the web server 36 may provide a list of individuals in the community 20 that a user or terminal outside the community 20 may wish to access. Thus, to make a telephone call, for example, an outside user can access the web server 36 over the public network 12, pick a destination user, and a call can be established between the outside user and a terminal or user inside the community 20.

In one example, a user sitting at one of the computers 26 may be a call center agent. The call center agent may be one of many call center agents that are responsible for answering inquiries or providing customer service to users outside the community 20. Thus, for example, an outside customer may call into the community 20, access the web server 36, and choose to speak to a call center agent to place a sales order or to make an inquiry.

The public network 12 may be coupled to various nodes, including a terminal 14, which may be a network telephone or a computer having voice and/or image processing capabilities. The network 12 may also be coupled through a media gateway controller 16 to a public switched telephone network (PSTN) gateway 18 that provides the interface between a PSTN 40 and a packet-based data network such as the network 12. The PSTN 40 is connected to wireline telephones 42 as well as to mobile telephones and other mobile unit through mobile switching centers.

In the example of FIG. 1, the client may be a system that resides on the public network 12 that desires to make a call into the community 20. A server may be one of the network nodes in the community 20, including the call server 24, web server 36, and so forth. It is contemplated that the designation of server and client is interchangeable if the direction of the call request is switched. Thus, for example, a user in the community 20 of FIG. 1 may initiate a call that is targeted to a terminal outside the community 20 on the public network 21. Also, both the client and server systems may reside within the community 20.

Figure 2:
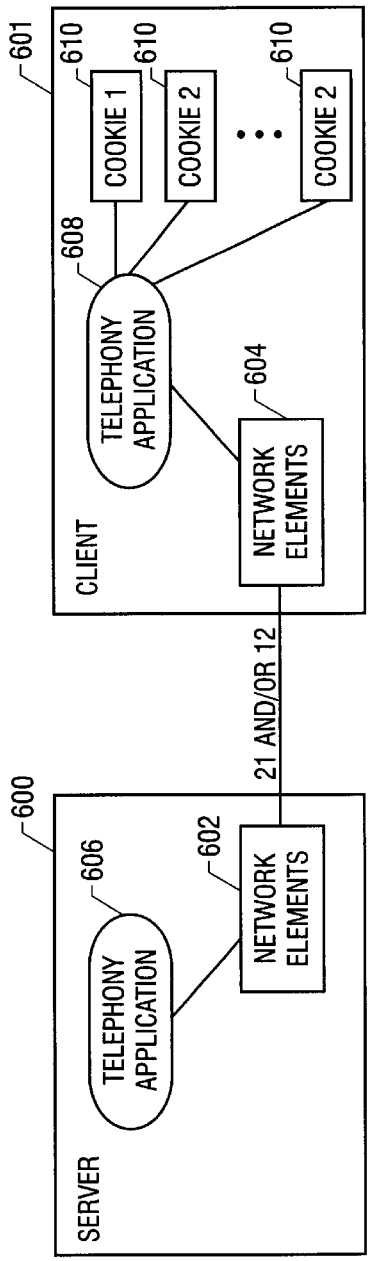
FIG. 2 illustrates a server system and a client system coupled over a network that may be involved in a telephony session.

Referring to FIG. 2, a server system 600 and client system 601 are illustrated. In the example arrangement of FIG. 2, the server and client systems are connected over the network 21 and/or network 12. Each of the server system 600 and client system 601 may be any one of the nodes or terminals illustrated in FIG. 1 as well as other types of devices. The server system 600 and client system 601 include network elements 602 and 604 (including network interfaces, drivers, and protocol stacks), respectively, to enable communication over the networks 21 and/or 12. Each of the server system 600 and client system 601 includes a telephony application 606 and 608, respectively, for handling telephony sessions over the network 21 and/or 12. In the client system 601, one or more telephony cookies 610 may be stored. Such cookies may have been created in telephony sessions established between the client system 601 and other terminals. The cookies 610 contain information identifying the terminals that were involved in the respective telephony sessions as well as other information describing the telephony sessions. In accordance with some embodiments, telephony cookies may be stored in the client system 601 for reference by future transactions with the telephony server system 600 or other terminals. Storing telephony cookies on a client system instead of a server system provides more efficient use of storage capacity. Instead of requiring a large storage capacity in a server system, such as one located in the community 20 (FIG. 1) which may receive many calls, server systems in the community can communicate telephony cookies to client systems for storage.

An advantage of using telephony cookies is that calls may be expedited, which saves customer time, company telephony resources, and so forth. Also, a destination user (the called party) may have access to such cookies to store notes for future reference. The destination user may use information stored in telephony cookies to handle future calls from the same caller. Further, an integrated voice response (IVR) system may use telephony cookies to store customer information and preferences for future calls. In addition, incomplete transactions may be noted in telephony cookies for handling in subsequent calls.

In some embodiments, the telephony cookie may be stored in an Extensible Markup Language (XML™) format, with one version described in "Extensible Markup Language (XML™) 1.0," Worldwide Web Consortium (W3C) Recommendation, dated February 1998. XML™ allows one to define a customized markup language for many classes of documents. XML™ may be used to encode may different types of information, including telephony cookies in accordance with some embodiments.

A telephony cookie may have the following fields:
Cookie ID <ID>;
Server telephone number <TELEPHONE>;
Cookie owner identification number <OWNER>;
Date and time left <LEFT>;
Expiration date/time <EXPIRES>;
Data field <DATA>.

The cookie ID uniquely identifies each telephony cookie. The server telephone number identifies the number of the called party. The cookie owner identification number identifies the calling terminal or party. The LEFT field indicates when the telephony cookie was created or modified. The EXPIRES field indicates when the telephony cookie expires. The DATA field can contain various elements to store various types of information, such as user or account names and passwords, user preferences, notes indicating events or conversation in prior call, status information (e.g., call prematurely cut off, will call back, etc.), DTMF codes received, and other information. To protect information, the DATA field may be scrambled or encrypted.

Figure 3:
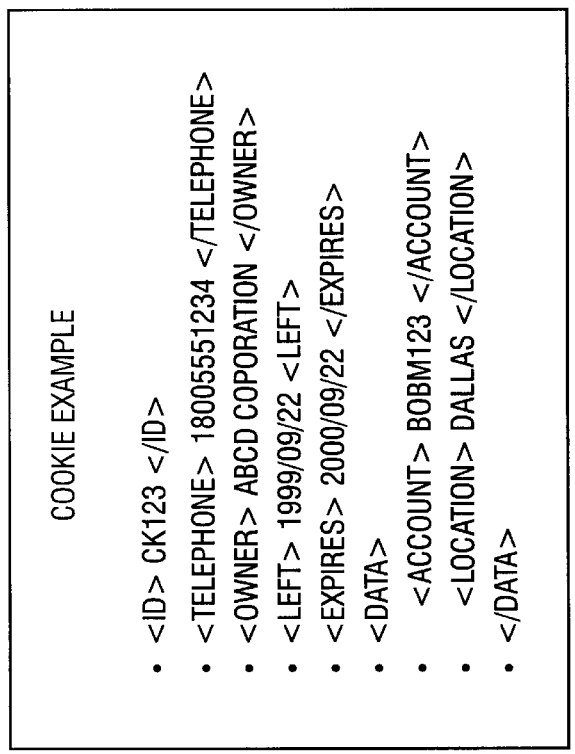
FIG. 3 illustrates an example of a telephony cookie in accordance with one embodiment that may be exchanged between the server system and client system of FIG. 10.

Referring to FIG. 3, an example telephony cookie according to the XML™ format is shown. The ID of the cookie is CK123, and the telephone number (TELEPHONE) of the called party is 1-800-555-1234. The owner of the telephony cookie (OWNER) is ABCD Corporation, and the creation or modification date of the telephony cookie (LEFT) is Sep. 22, 1999. The telephony cookie may expire on Sep. 22, 2000, as indicated by the EXPIRES field. User specific information may be stored in the DATA field, with an account name BOBM123 and location in Dallas. The telephony cookie illustrated may be stored for future reference in communications between ABCD Corporation and the called party at 1-800-555-1234. Further information may be stored in the DATA field, including notes about prior call, preferences of a customer, and so forth. Also, the DATA field may identify a menu (such as a menu of an IVR system) that a user wishes to start from, which may be different from the main menu. For example, an IVR system may provide various different options (e.g., customer service department, sales department, etc.). Instead of reaching the main IVR menu each time a user calls a given telephone number, the DATA field of a telephony cookie can keep track of another menu that the user wishes to start from instead. Examples of IVR systems include automated attendants, voice mail systems, and other systems capable of receiving some type of user input, either DTMF signals or voice data, to navigate through different menus or options.

Figures 4, 5:
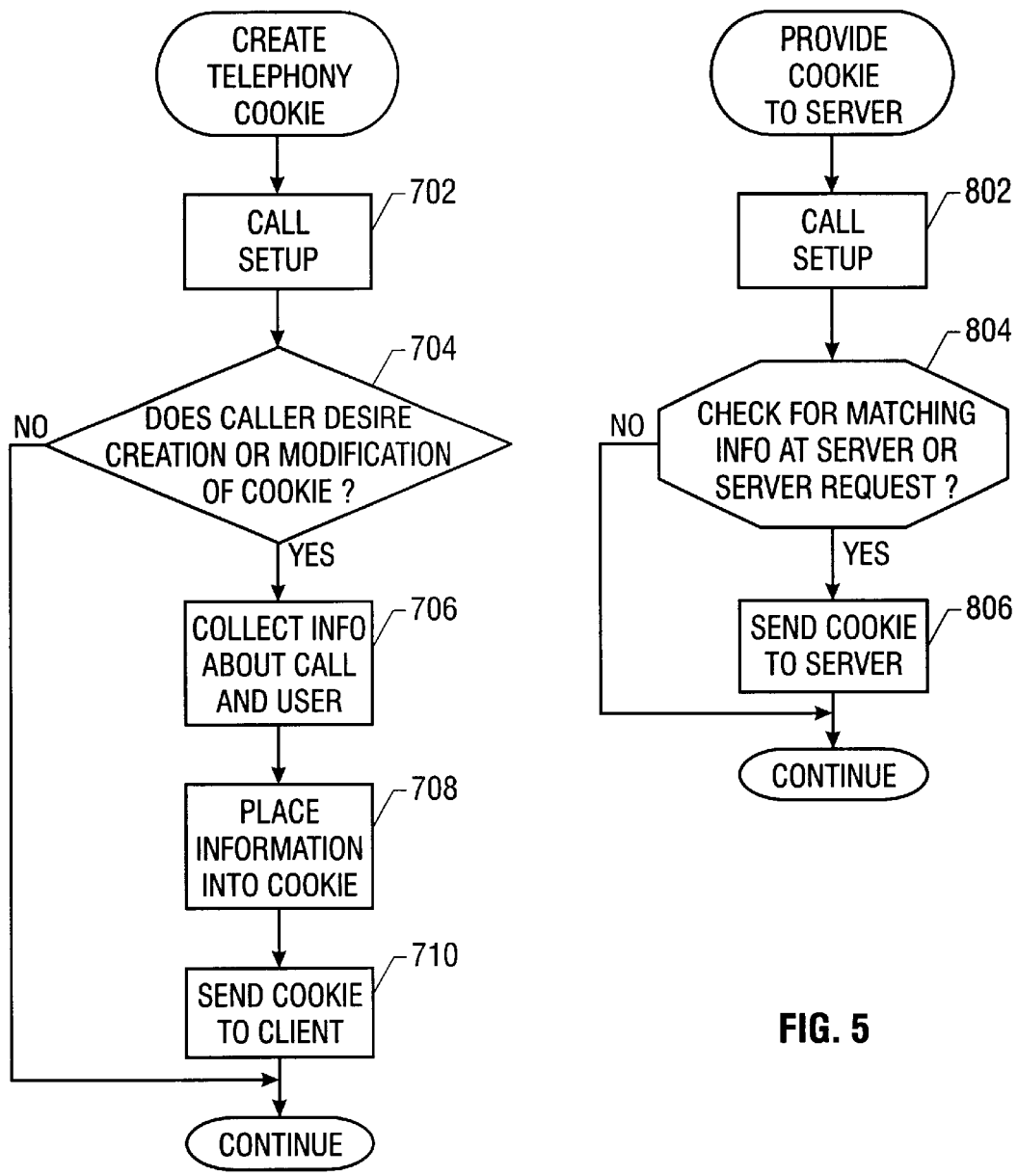
FIGS. 4 and 6 are flow diagrams of tasks performed by the server system of FIG. 10 for creating and retrieving telephony cookies in accordance with one embodiment.
FIG. 5 is a flow diagram of a process of providing a telephony cookie from the client system to the server system of FIG. 10 in accordance with one embodiment.

Referring to FIG. 4, the process of creating or modifying a telephony cookie as performed by the server system 600 is illustrated. The server system 600 determines if a call has been established (at 702). Next, the server system 600 determines (at 704) if the caller desires creation or modification of a telephony cookie. The server system 600 may prompt the calling party by providing a voice prompt or by sending a pop-up window in the user interface of the client system 601. If the caller indicates a desire for the creation or modification of a telephony cookie, then information about the call can be collected (at 706). In an alternative embodiment, creation and modification of cookies may be automatically enabled unless the client system 601 indicates a desire not to accept cookies. The collected information is then placed (at 708) into a telephony cookie. If a telephony cookie describing a prior telephony session between the calling party (or terminal) and the called party (or terminal) already exists, then the new information may be placed into the existing telephony cookie to modify the cookie. The telephony cookie is then sent (at 710) to the client system 601.

Referring to FIG. 5, the process of providing a telephony cookie from the client system 601 to the server system 600 is illustrated. Once a call has been established (at 802), the client system 601 checks (at 804) for matching server system 600 information to determine if a telephony cookie exists for the called terminal or party. A match may be performed by matching the current called telephone number with the TELEPHONE field in each of the cookies that are stored in the client system 601. If a matching telephony cookie is found in the client system 601, then the telephony cookie is sent (at 806) to the server system 600.

Figure 6:
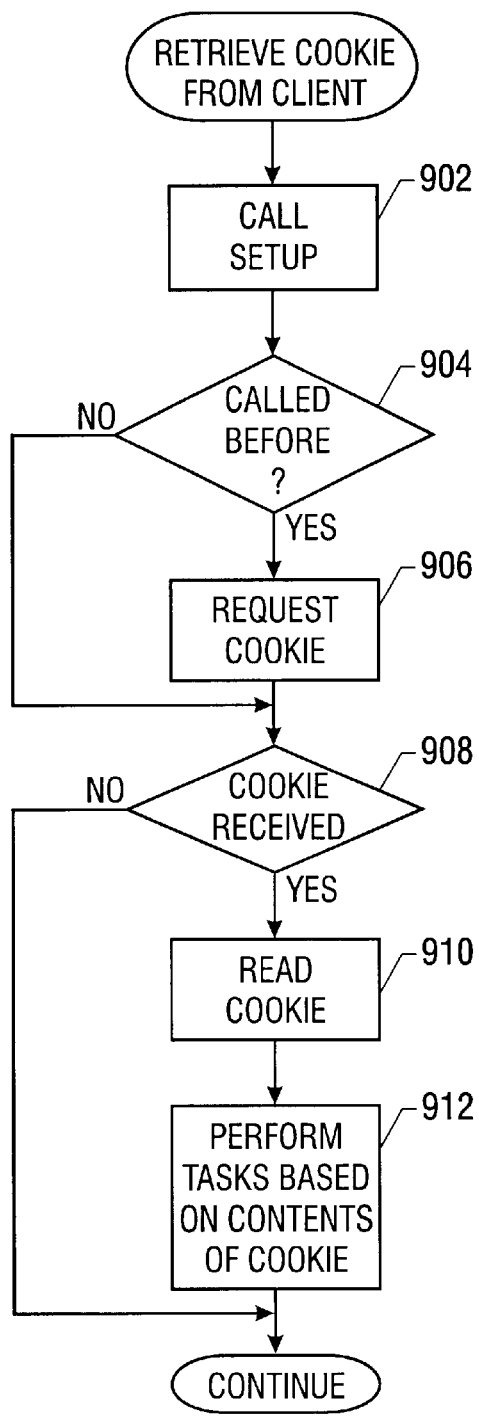

Referring to FIG. 6, after the server system 600 detects a call has been established (at 702), it determines if the client system 601 has called before (at 904). If so, the server system 600 may request (at 906) a copy of a telephony cookie describing the prior telephony session from the client system 601. The server system 600 then waits (at 908) for the telephony cookie to arrive. Next, the server system reads (at 910) the contents of the telephony cookie and performs (at 912) tasks based on the contents of the telephony cookie.

An example of how cookies may be used is described below. A customer may call an institution that the customer has an account with (such as a bank, a travel agency, a club, an airline, and so forth). The customer may call from a network telephone or from a computer that is outfitted with voice processing capabilities. Once the connection is made to the institution, the customer is prompted to enter his or her account number and password. The customer may then be asked if the customer would like the system to remember the account name and password. If so, the telephony server may leave a telephony cookie on the client. When the user calls in the future, the client may send the telephony cookie to the telephony server to authenticate the client without having to retype the account name and password.

Another example is when a customer calls a location dependent voice information server (such as an answering service operated by a movie theater). The customer may be asked to enter his or her zip code for the list of theaters closest to the customer. The server may leave a telephony cookie on the client so that the next time the customer calls, the telephony server can retrieve the zip code from the telephony cookie and automatically provide the desired list of theatres.

In another application, the customer may call an IVR system and navigate through the menus of the system to get to the information the customer is interested in. The telephony server may give the customer an option to make the accessed menu the starting menu on the next access. The next time the customer calls, the customized starting menu may be immediately accessed based on the telephony cookie left on the client system of the customer. Other types of preferences may also be saved to be used in subsequent calls.

Another usage example is when a customer calls a call center and gets connected to a particular call center agent (out of a pool of many agents). The customer transacts business with the agent. The agent may instruct the application that is used by the agent to leave telephony cookies on the client agent. The telephony cookie may include the following information, such as the agent name so that the customer may connect to the agent automatically on the next call and information about the customer's problem to warn other agents if the customer calls back again.

A method and apparatus is provided to store information about telephony sessions in a record, which may be in the form of a telephony cookie. When a telephony session is established between two terminals, information may be collected about the telephony session. Such information may include identifiers of the two parties or terminals involved in the telephony session as well as other information describing the telephony session. Such other information may identify the time of the call, user preferences, user account names and passwords, notes regarding prior calls, and so forth.

The information may include input data, such as numeric key pad entries or voice data. Such input data may also identify menus that have been navigated by a user through an automated answering system such as an IVR system. A desired starting menu other than the default main menu may be specified. The input data may also include security access information, such as account names and passwords. The input data may also include notes about a telephony session. The input data may be received form a calling terminal, or it may be received from a called terminal.

In one embodiment, in a telephony session between a client system and a server system, the telephony cookie created by a server system may be sent to a client system for storage. The telephony cookie may then be accessed by the server system in a subsequent telephony session between the server system and client system. By storing the telephony cookie in the client system instead of in the server system, more efficient usage of storage space is provided. If the server system is associated with an enterprise that users frequently call, then storing telephony cookies on the server system may quickly overwhelm the storage capacity of the server system. Thus, by storing the telephony cookies on client systems, massive storage devices are not needed at the server system.

Figure 7:
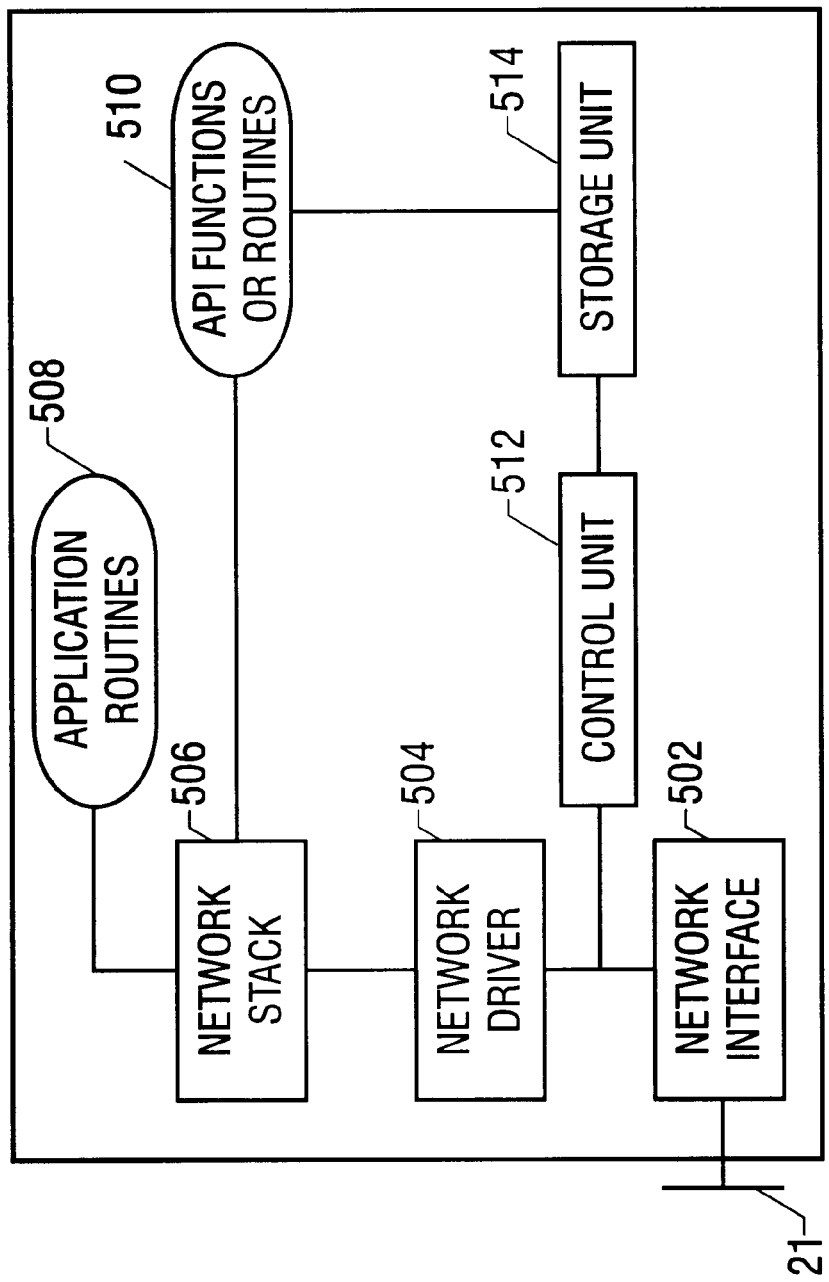
FIG. 7 is a block diagram of components of an example network node in the communications system of FIG. 1.

Referring to FIG. 7, the components of an example network node or terminal are illustrated. The network node or terminal represented in FIG. 7 may be any one of the nodes discussed above, such as the call server 24, the media gateway controller 28, the voice storage server 23, the database system 22, the web server 36, any terminal with network interface capabilities, and so forth. Each network node may include a network interface 502 that provides the communications interface between the network 21 or 12 and the other components of the network node. A network device driver 504 may be coupled to the network interface, and a network stack 506 may receive data communicated over the network 21 or 12 according to some network protocol, such as IP and TCP (Transmission Control Protocol) or UDP (User Datagram Protocol).

Application routines 508, such as telephony application routines, may reside in the network node. The application routines 508 may be executable on a control unit 512, and data and instructions may be stored in the storage unit 514.

The various control units, such as the control unit 512 in FIG. 7, may each include a microprocessor, a microcontroller, a processor card (including one or more microprocessors or controllers), or other control or computing devices. The storage units referred to in this description, such as the storage unit 514 in FIG. 7, may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions that make up the various software routines, modules, or functions in the various network nodes or terminals may be stored in respective storage units. The instructions when executed by a respective control unit cause the corresponding node or element to perform programmed acts.

The instructions of the software routines or modules may be loaded or transported into the node or element in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In one embodiment, to implement telephony services in the communications system 10, a telephony scripting language (TSL) may be defined to create scripts that implement the various telephony services. In one embodiment, scripts for performing various services may be stored as script modules 104 in one or more storage media. The script modules 104 are accessible by a service scripting engine 100 that is coupled to the network 21. Upon receipt of a request to establish a communications session (also referred to as a "call request"), the scripting engine 100 invokes one of the script modules 104 for execution to perform one or more actions in response to various triggers. A script according to TSL may include a plurality of states. TSL may define triggers to cause transitions between the states. An action may be performed in a state or in a transition between states. In accordance with some embodiments, the triggers and actions that are available in TSL are more robust than conventional mechanisms for implementing telephony services.

Actions specified in an executed script module may correspond to telephony services to be performed by one or more of the nodes coupled to the network 21. Requests to perform such actions may be communicated by the service scripting engine 100 to nodes coupled to the network 21 through corresponding application programming interfaces (APIs). Thus, for each action specified by a script module, the scripting engine 100 may translate or convert the action to one or more calls to functions or routines specified by each API. Referring again to FIG. 7, API functions or routines 510 may also be part of the network node. Such API functions or routines 510 may be called by the script engine 100. The API functions or routines 510 may be executable on the control unit 512.

Figure 8:
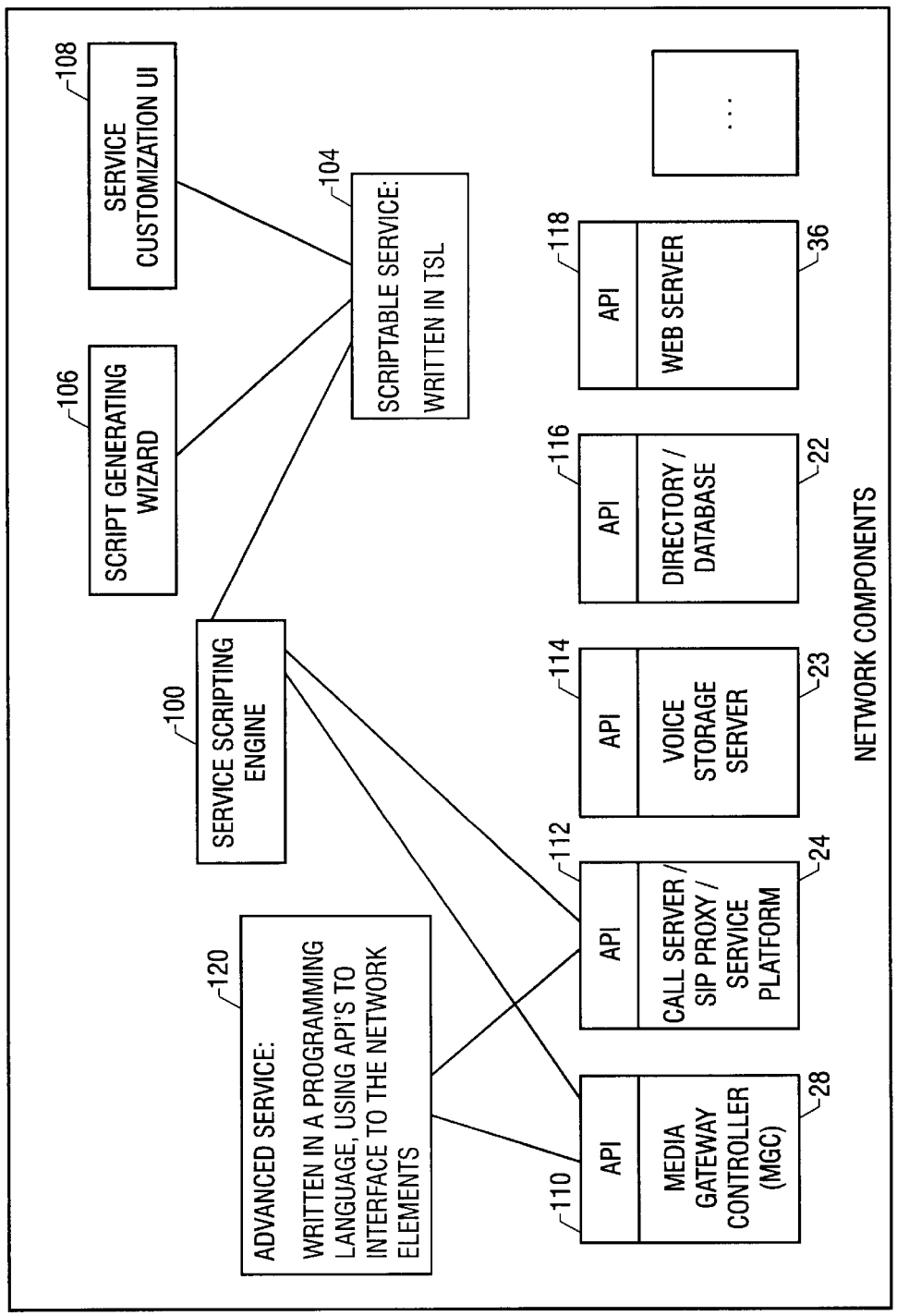
FIG. 8 is a block diagram of components in the communications system of FIG. 1 including a service scripting engine in accordance with one embodiment.

Referring to FIG. 8, each of the nodes coupled to the network 21, including the media gateway controller 28, the call server 24, the voice storage server 23, the database system 22, the web server 36, and so forth, may include a corresponding API 110, 112, 114, 116, and 118, with each defining functions or routines the scripting engine 100 can call to perform actions specified during execution of a script module. The called API function or routine is then executed in the respective node to perform the requested action. The API residing in each node depends on the tasks that are to be performed by that node. Thus, for example, the call server 24 may include one type of API, while the database system 22 may include another type of API, such as the API defined by the Lightweight Directory Access Protocol (LDAP) Specifications from the IETF. Any type of API may be employed in any given node, provided that the scripting engine 100 is aware of the API and can make calls to functions or routines in the API.

The script modules 104, residing in one or more storage media accessible by the service scripting engine 100, may be created by a script generating wizard 106 and/or a user interface (UI) 108. For services that are not implementable by scripts according to TSL, other modules 120 written in a more advanced programming language may be used to implement those services. Such programming languages may include C++, Java, and others.

In accordance with one embodiment, TSL may be a text-based language according to XML™. Each script module may be represented as a state machine including a number of states and triggers that control transitions between different states. In each state or in transitions between states, certain actions corresponding to telephony services may be specified.

Figure 9:
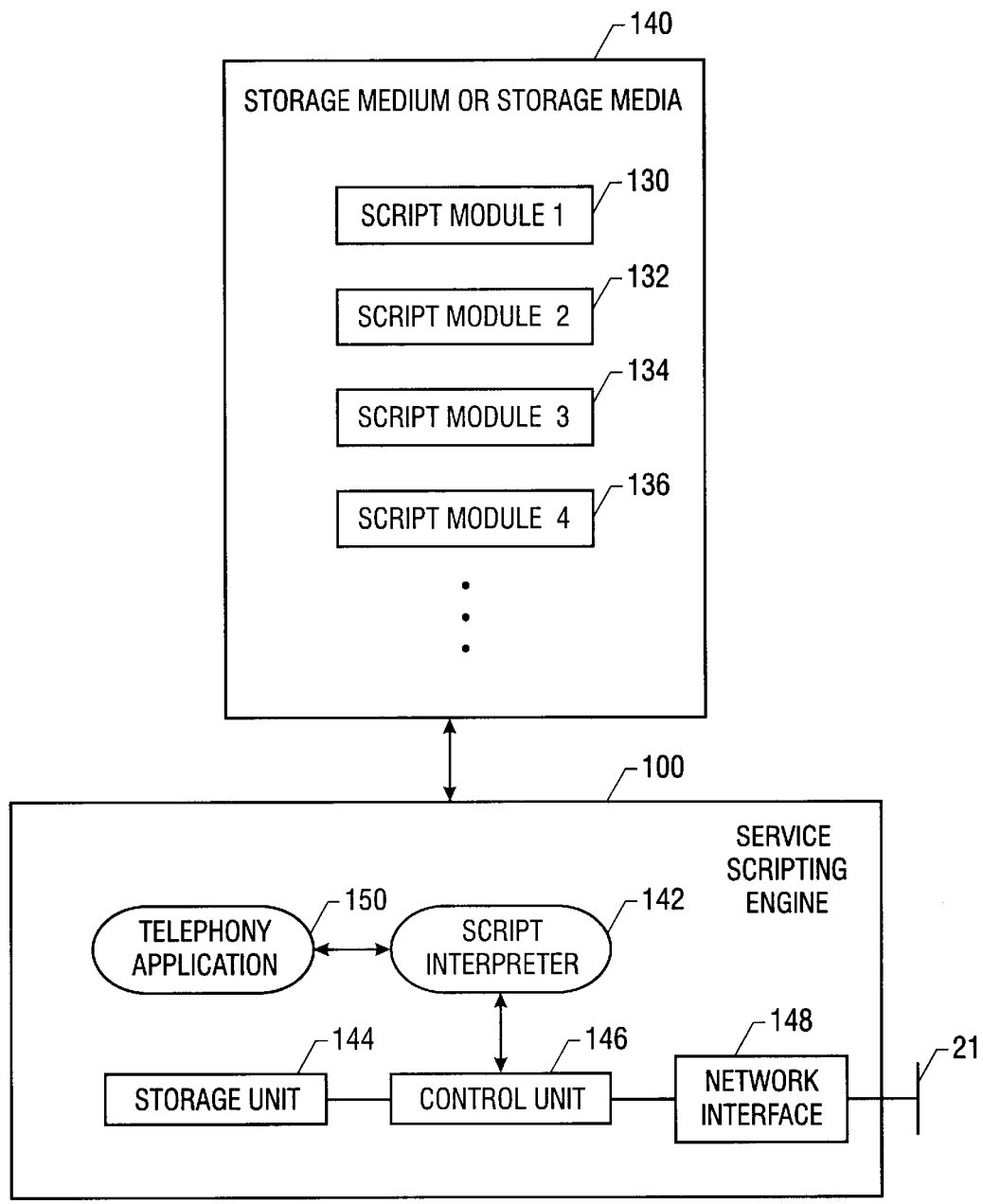
FIG. 9 illustrates script modules stored on one or more storage media and the service scripting engine of FIG. 2 in accordance with one embodiment.

Referring to FIG. 9, a plurality of script modules 130, 132, 134, and 136 may be stored on one or more storage media 140. The one or more storage media 140 may be separate from or part of the service scripting engine 100. The one or more storage media 140 may be in one platform, or they may be distributed among nodes on the network 21. The scripting engine 100 includes a script interpreter 142 to parse and execute the script modules in the one or more storage media 140. For example, the script interpreter 142 may include an XML™ parser to parse XML™ script modules. The script interpreter 142 may be executed on a control unit 146 in the scripting engine 100. The control unit 146 may be operatively coupled to a storage unit 144 that stores data and instructions and to a network interface 148 that provides a communications interface to the network 21.

The scripting engine 100 may also include a telephony application 150, which may be adapted to receive call requests as well as to send requests including calls to functions or routines of the APIs residing in the various network nodes. When a call request is received over the network 21, the telephony application 150 in the service scripting engine 100 processes the call request, which is matched to one of the script modules in the one or more storage media 140. The appropriate script module is then executed by the script interpreter 142. The actions specified in the executed script module are converted by the telephony application 150 into corresponding calls to functions or routines in the APIs of the various network nodes.

The number of script modules may be one or more. Thus, one script module may be defined for the entire community 20. Alternatively, the community 20 may be divided into many groups, with one script module assigned to each group. In another arrangement, different users may be assigned their own script modules. Thus, a different script module may be executed depending on the called user or group. Alternatively, different script modules may be executed depending on the time of call. Thus, for example, one set of script modules may be executed during business hours while another set of script modules may be executed during non-business hours.

Using the script generating wizard 106 or service customization user interface 108 (FIG. 8), additional script modules may be easily created. Thus, for example, a user wishing to have call requests to him or her processed in a certain way may create a customized script module to perform the desired services.

A centralized scripting engine 100 is depicted in FIGS. 8 and 9. In other embodiments, a more distributed scheme may be used in which multiple scripting engines may be provided. For example, each network node capable of participating in a telephony session may run a scripting engine to execute an appropriate script module in response to an event. Thus, generally, at least one service scripting engine may be provided in the communications system 10 to execute appropriate script modules to provide telephony services. The script modules may be stored centrally or in a distributed manner.

Figure 10:
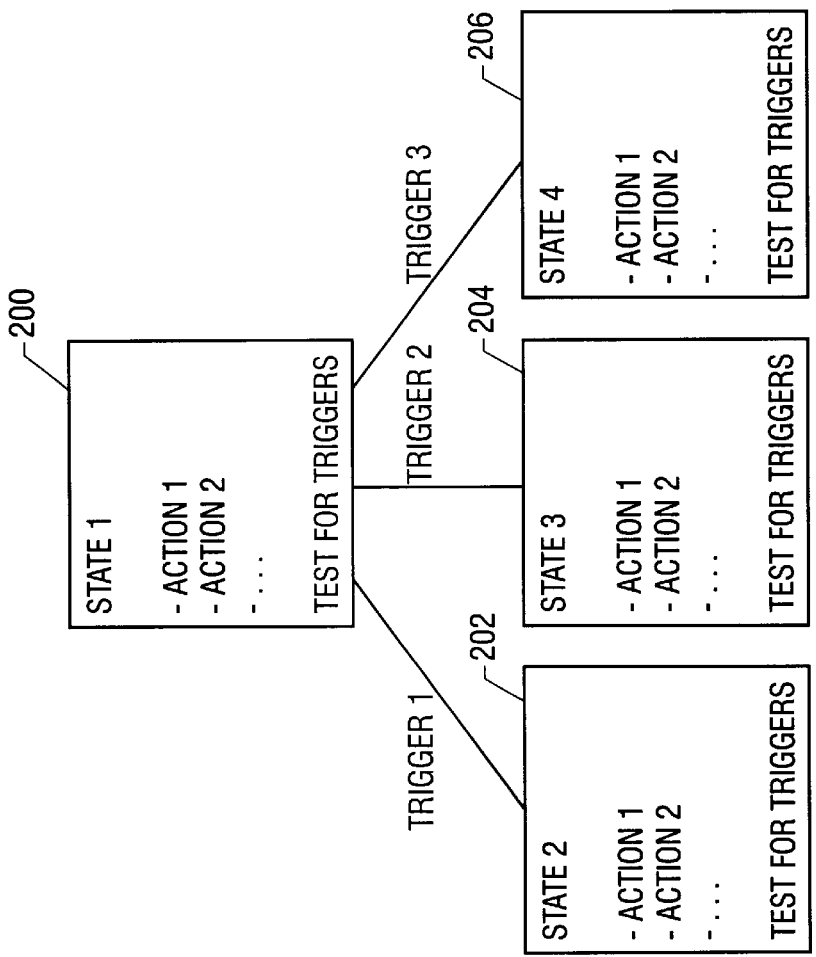
FIG. 10 illustrates a state machine representing a script module of FIG. 3 in accordance with one embodiment.

Referring to FIG. 10, an example of a TSL state machine in a TSL script module is illustrated. In the example shown in FIG. 10, four states 200, 202, 204, and 206 are defined: state 1, state 2, state 3, and state 4. Within each state or in transitions between states, actions may be specified. Also, to transition between states, the state machine tests for one or more triggers in each state. Thus, as illustrated, trigger 1 causes the state machine to transition from state 1 to state 2, trigger 2 causes the state machine to transition from state 1 to state 3, and trigger 3 causes the state machine to transition from state 1 to state 4. Other triggers may cause transitions between different states.

As used here, triggers are basically test conditions that cause the state machine making up a TSL script module to transition from one state to another. Actions are the tasks that are to be performed by the state machine or by a node coupled to the network 21. Referring to FIGS. 11 and 12, some of the triggers 300 and actions 302 that may be defined in TSL are illustrated. The triggers 300 may include the following: a caller identifier (to identify the calling party or terminal); a called identifier (to identify the party or terminal being called); a time indicator (to indicate the time of the call); a call progress state indicator (to indicate whether a call is busy, the number of rings that have transpired, whether there is no answer, and so forth); an indicator of detection of DTMF (dual tone multi-frequency) signals; information stored in a remote telephony cookie; an indicator of a global data test; an indicator of a database test; and an indicator of detection of voice data. Other triggers may also be defined.

DTMF signals and voice data may be part of user inputs. For example, a user may be prompted to enter a certain number on his or her telephony key pad, which generates a corresponding DTMF signal. Alternatively, a user may also be prompted for a voice response, which may be converted into voice data that can be received and processed. Thus, user input may refer to any signal or data generated due to some user action at one terminal.

A global data test is performed to detect the current state of a variable or flag. For example, a variable in a script module or elsewhere may be incremented or a flag updated based on predetermined conditions. The global data test detects for certain values or states of the variable or flag to trigger a desired action.

A database test may be performed to determine if a calling party or terminal is authorized to access users or nodes in the community 20 or if a called party or terminal is within the community 20. As used here, a "calling point" or "called point" may refer to either a calling or called party or a calling or called terminal, or a combination of both the party and the terminal. Authorization of a calling point may be performed based on the calling party's user or account name and password, as examples. The database system 22 may be accessed to perform this test.

The actions 302 that may be specified in a telephony script module may include the following: play announcement; play DTMF signal, detect a DTMF signal; record message; forward (to one or more terminals); transfer a call; notify a terminal of a message or data; place a telephony cookie at a remote terminal; read contents of a telephony cookie; perform global data set and modify (to set or modify a variable or flag); log an action; and detect for a voice data. Other actions may also be defined.

Using the triggers and actions defined by TSL, a relatively large number of telephony services may be implemented. Such telephony services may include PBX services, call center behavior services, voice mail application services, integrated voice response (IVR) behavior and vertical market services (such as customer defined services including billing for length of call and so forth).

Figure 13:
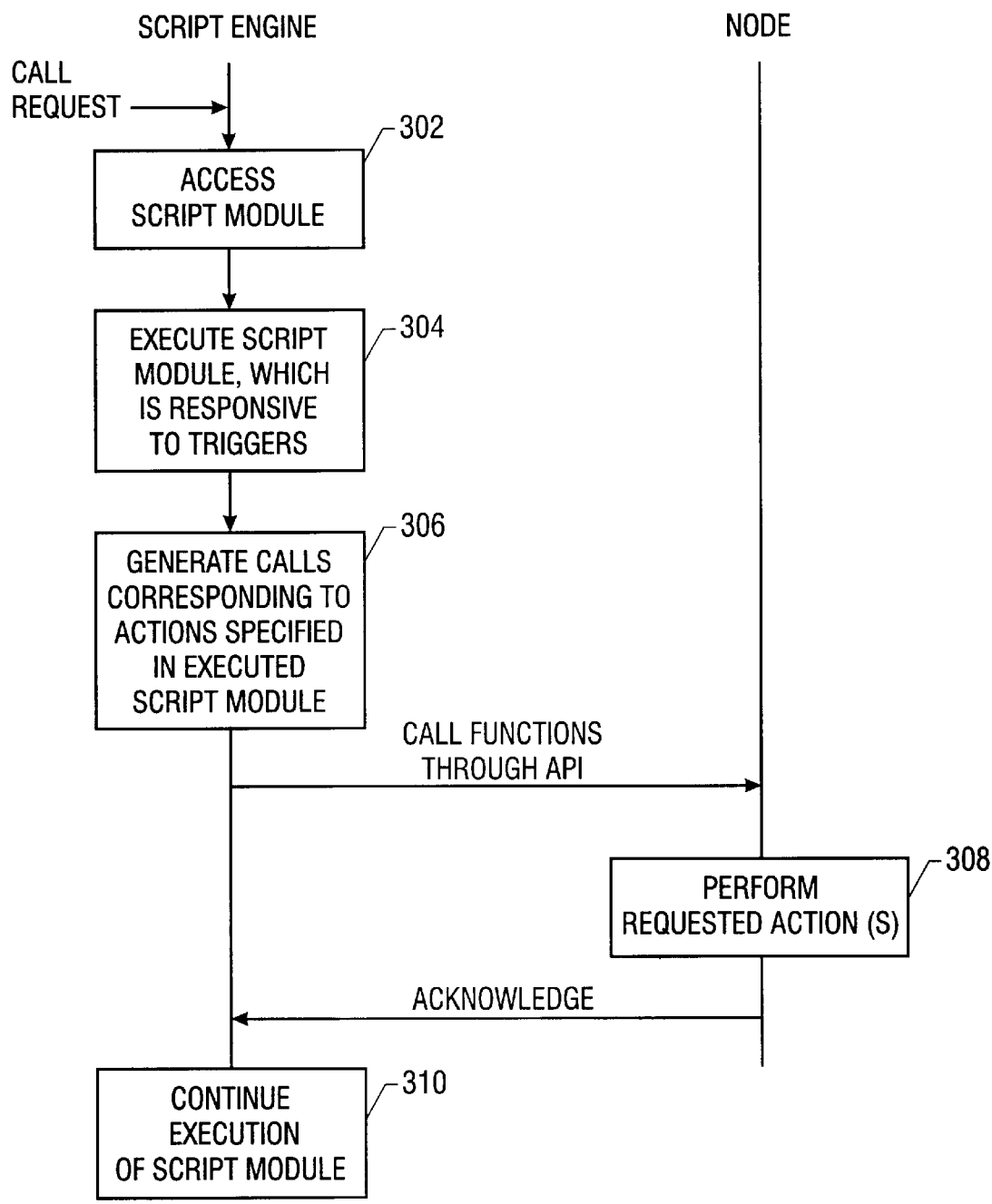
FIG. 13 illustrates processing of a call request by communications system components of FIG. 2 in accordance with one embodiment.

Referring to FIG. 13, in response to receipt of a call request (whether incoming into the community 20 or outgoing from the community 20), the script engine 100 accesses (at 302) a corresponding one or the script modules stored in the one or more storage media 140. The script module is then executed (at 304) and the script engine 100 transitions between different states of the script module in response to triggers that may be associated with the call request or that may come in after the call request (such as a DTMF tone, detection of a remote telephony cookie, a global data test, number of rings that have transpired, a busy signal, and so forth).

In executing the script module, various actions may be specified when the script module transitions to different states of its state machine. Based on these specified actions, the script engine 100 may generate (at 306) requests that correspond to actions specified in the executed script module. Such requests may be in the form of calls to functions or routines in the APIs of associated network nodes. For example, the actions specified may be "play announcement." To do so, the script engine 100 may generate a first call to the call server 24 to make a connection to the voice storage server 23. When the call server 24 returns an acknowledgment that a session has been established between the caller and the voice storage server 23, the script engine 100 may issue a second call to the voice storage server 23 to play the desired announcement.

The functions or routines in the API of the node that has been called by the script engine 100 performs (at 308) the requested action or actions. The node then returns an acknowledgment back to the script engine 100, which continues (at 310) with its execution of the script module to completion.

Figure 14:
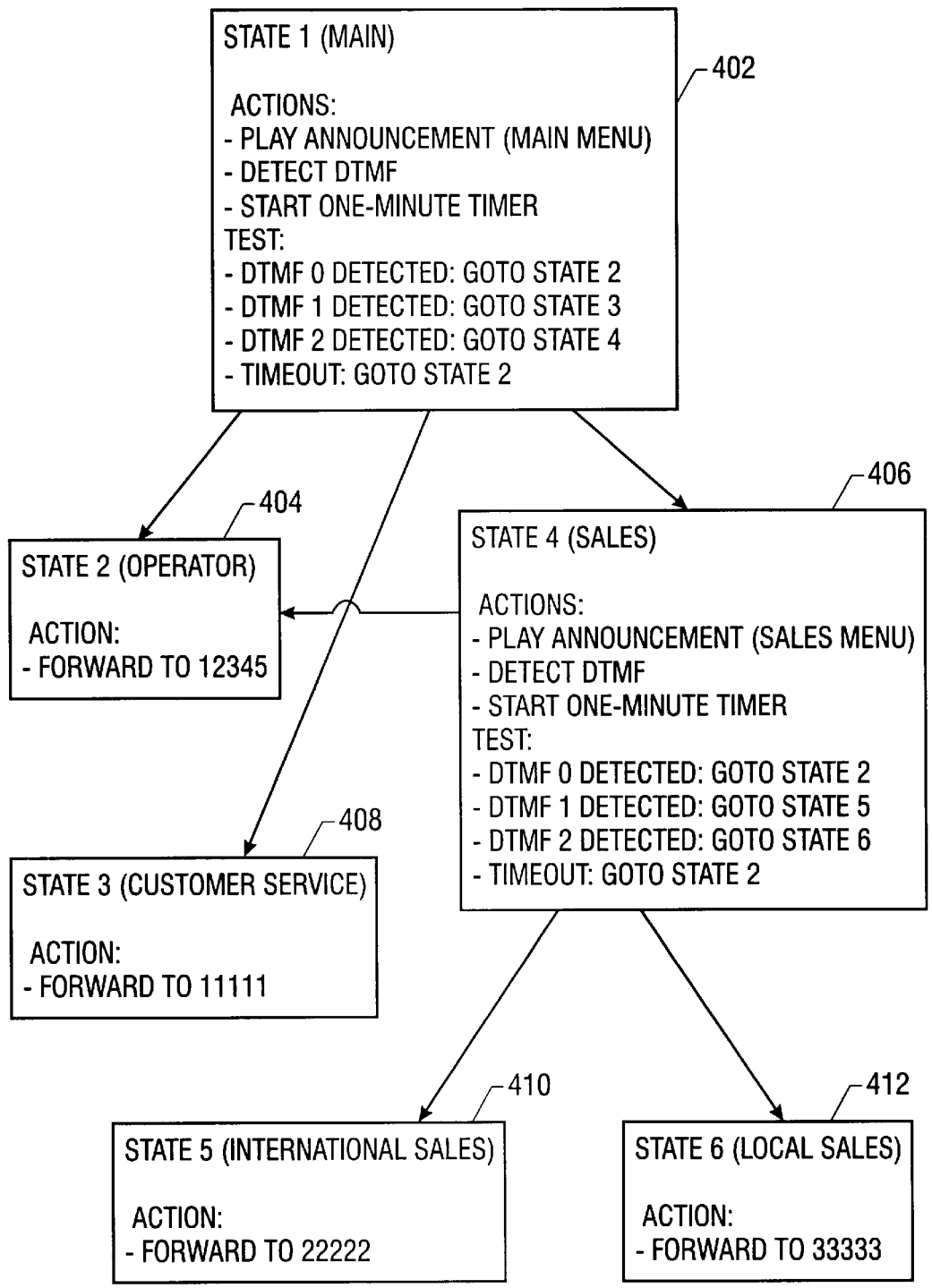
FIG. 14 illustrates an example script that provides for integrated voice response (IVR) tasks.

Referring to FIG. 14, an example of a script module is illustrated. The FIG. 14 example illustrates one implementation of an integrated voice response (IVR) task. The IVR script module includes six states: state 1 (402), state 2 (404), state 3 (408), state 4 (406), state 5 (410), and state 6 (412). In state 1, which is the main state, actions performed include playing the main menu announcement, detecting for a DTMF tone (or detecting for voice data), and a starting a one-minute timer. Triggers tested for include detecting for DTMF signals that correspond to digits 0, 1, and 2 and a timeout condition when the one-minute timer expires. Alternatively, voice data representing the numbers 0, 1, and 2 may be detected for. If DTMF 0 is detected, then the IVR script module transition to state 2. If DTMF 1 is detected, then the IVR script module transitions to state 3. If DTMF 2 is detected, then the IVR script module transitions to state 4. Detection of a timeout condition causes the IVR script module to transition to state 2. State 2 is the operator state, and the action performed is forwarding of the call to extension 12345, which is the extension of the operator.

State 3 is the customer service state, and the action performed in state 3 is forwarding of the call to extension 11111, which is the telephone extension of the customer service department.

State 4 is the sales department state, and the actions performed may include playing the sales menu announcement, detecting for a DTMF tone (or voice data), and a starting a one-minute timing. Triggers that are tested for include detection of DTMF tones 0, 1, and 2 or a timeout condition. Detection of DTMF 0 or a timeout condition causes the IVR script module to transition to state 2, the operator state. Detection of DTMF 1 causes the IVR script module to transition to state 5, which is the international sales state. The action performed in state 5 is forwarding of the call to extension 22222. Detection of DTMF 2 causes the IVR script module to transition to state 6, which is the local sales state. The action performed in state 6 includes forwarding of the call to the local sales telephone extension.

A telephony scripting language has been defined to create script modules that provide for telephony services. The script modules may be executed by one or more script engines on the network nodes or elements in a communications system. Each script module defines various states and actions performed in those states or in transitions between states. Triggers may be associated with a call request or may originate from another source. For example, a trigger may be a receipt of a user input such as a DTMF signal from depression of keys in the keypad of a telephone or voice data. The actions specified in each state of the TSL script module may be converted to a call of a function or routine in a API of the appropriate network node.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a telephony communications system, comprising:

establishing a packet-based telephony session between a calling point and a called point;

collecting information about the packet-based telephony session, the information including data describing interaction between the calling point and the called point during the telephony session, the information selected from the group consisting of voice data from the user, dual-tone multi-frequency signals, and an indicator of a desired one of plural menus to be used as a starting menu of an automated answering system; and communicating a cookie for storage at least at one of the calling and called points, the cookie containing at least one of the voice data from the user, the dual-tone multi-frequency signals, and the indicator of a desired one of plural menus to be used as a starting menu of an automated answering system.

2. The method of claim 1 further comprising accessing the record in a subsequent telephony session and using information stored in the record in the subsequent telephony session.

3. The method of claim 1, wherein collecting the information includes collecting further information identifying the calling point, the cookie further containing the information identifying the calling point.

4. The method of claim 1, wherein collecting the information includes collecting further information identifying when the record was created, the cookie further containing the information identifying when the record was created.

5. A storage device for storing data accessible by one or more software routines for providing telephony services in a communications system, the storage device comprising:

a cookie stored in the storage device and including information describing a packet-based telephony session between a calling point and a called point, the information including input data received from the calling point by the called point during the telephony session, the cookie including at least one of user voice data, dual-tone multi-frequency signals, and an indicator of a desired one of plural menus to be used as a starting menu of an automated answering system.

6. The storage device of claim 5, wherein the cookie is according to an Extensible Markup Language.

7. A data signal embodied in a carrier wave comprising data segments containing data for use in telephony sessions between a calling terminal and a called terminal in a communications system, the data comprising:

a cookie according to a predetermined format, the cookie including information identifying a packet-based telephony session, the information including at least one of input data from the calling terminal or input data from the called terminal, the cookie including at least one of user voice data, dual-tone multi-frequency signals, and an indicator of a desired one of plural menus to be used as a starting menu of an automated answering system.

8. A system for use in a communications system having a packet-based network, comprising:

an interface unit to communicate in a packet-based telephony session with a calling terminal over the packet-based network; and a control unit adapted to create a telephony cookie to store information about the telephony session and to communicate the telephony cookie over the packet-based network, the telephony cookie containing at least one of user voice data, dual-tone multi-frequency signals, and an indicator of a desired one of plural menus to be used as a starting menu of an automated answering system.

9. The system of claim 8, wherein the control unit is adapted to send the telephony cookie over the packet-based network to the calling terminal for storage.

10. The system of claim 8, wherein the telephony cookie contains data received during a telephony session from the calling terminal.

11. The system of claim 8, wherein the control unit is adapted to communicate voice traffic of the telephony session over the packet-based network.

12. An apparatus for use in a telephony communications system, comprising:

means for establishing a packet-based telephony session between a first terminal and a second terminal over a packet-based network;

means for communicating voice traffic over the packet-based network in the telephony session means for retrieving a cookie of a prior telephony session between the first and second terminals over the packet-based network, the cookie containing at least one of user voice data, dual-tone multi-frequency signals, and an indicator of a desired one of plural menus to be used as a starting menu of an automated answering system; and means for accessing information stored in the cookie for use in the current telephony session.

13. An article including one or more machine-readable storage media containing instructions for describing a packet-based telephony session between a calling terminal and a called terminal in a communications system, the instructions when executed causing a system to:

collect information about the packet-based telephony session, the information including input data received from the calling terminal during the telephony session; the input data describing interaction between the calling and called terminals during the telephony session; and store the collected information in a cookie, wherein the cookie contains at least one of dual-tone multi-frequency signals, user voice data, and an indicator of a desired one of plural menus to be used as a starting menu of an automated answering system.

14. A method for use in a telephony communications system, comprising:

establishing a packet-based telephony session between a first terminal and a second terminal over a packet-based network;

communicating voice traffic over the packet-based network in the telephony session;

retrieving a record of a prior telephony session between the first and second terminals over the packet-based network; and accessing information stored in the record for use in the current telephony session, wherein retrieving the record comprises retrieving a cookie including user voice data.

15. The method of claim 14, wherein the first terminal is a calling terminal and the second terminal is a called terminal, wherein retrieving the record includes retrieving the record stored in the calling terminal.

16. A method for use in a telephony communications system, comprising:

establishing a packet-based telephony session between a first terminal and a second terminal over a packet-based network;

communicating voice traffic over the packet-based network in the telephony session;

retrieving a record of a prior telephony session between the first and second terminals over the packet-based network; and accessing information stored in the record for use in the current telephony session, wherein retrieving the record comprises retrieving a cookie containing dual-tone multi-frequency signals.

17. A method for use in a telephony communications system, comprising:

establishing a packet-based telephony session between a first terminal and a second terminal over a packet-based network;

communicating voice traffic over the packet-based network in the telephony session;

retrieving a record of a prior telephony session between the first and second terminals over the packet-based network; and accessing information stored in the record for use in the current telephony session, wherein retrieving the record comprises retrieving a cookie containing an indicator of a desired one of plural menus to be used as a starting menu of an automated answering system.

* * * * *